(12) United States Patent
Lee

(10) Patent No.: US 11,468,324 B2
(45) Date of Patent: Oct. 11, 2022

(54) METHOD AND APPARATUS WITH MODEL TRAINING AND/OR SEQUENCE RECOGNITION

(71) Applicant: Samsung Electronics Co., Ltd., Suwon-si (KR)

(72) Inventor: Hodong Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 393 days.

(21) Appl. No.: 16/831,206

(22) Filed: Mar. 26, 2020

(65) Prior Publication Data

US 2021/0110258 A1 Apr. 15, 2021

(30) Foreign Application Priority Data

Oct. 14, 2019 (KR) ........................ 10-2019-0127019

(51) Int. Cl.
| | |
|---|---|
| *G06N 3/08* | (2006.01) |
| *G06F 40/284* | (2020.01) |
| *G06N 7/06* | (2006.01) |
| *G06N 3/04* | (2006.01) |
| *G06F 40/40* | (2020.01) |
| *G10L 15/06* | (2013.01) |
| *G10L 15/16* | (2006.01) |

(52) U.S. Cl.
CPC ............ *G06N 3/08* (2013.01); *G06F 40/284* (2020.01); *G06F 40/40* (2020.01); *G06N 3/04* (2013.01); *G06N 3/0445* (2013.01); *G06N 3/0454* (2013.01); *G06N 7/06* (2013.01); *G10L 15/063* (2013.01); *G10L 15/16* (2013.01)

(58) Field of Classification Search
CPC .......... G06N 3/08; G06N 3/04; G06N 3/0445; G06N 3/0454; G06N 7/06; G06F 40/284; G06F 40/40; G10L 15/063; G10L 15/16
USPC ........................................................... 706/25
See application file for complete search history.

(56) References Cited

U.S. PATENT DOCUMENTS

| | | | |
|---|---|---|---|
| 7,480,619 B1 * | 1/2009 | Scott | ............................. 704/275 |
| 10,776,581 B2 * | 9/2020 | McCann | .................. G06N 3/04 |
| 11,295,081 B1 * | 4/2022 | Federico | .................. G06N 3/08 |
| 2016/0027437 A1 * | 1/2016 | Hong | .................... G10L 15/187 |
| | | | 704/254 |

(Continued)

FOREIGN PATENT DOCUMENTS

KR    10-2016-0013710 A    2/2016

OTHER PUBLICATIONS

Takezawa, T et al., "A New Evaluation Method for Speech Translation Systems and a Case Study on ATR-MATRIX From Japanese to English", *MT Summit VII*, Sep. 1999,(pp. 299-307).

(Continued)

*Primary Examiner* — Edwin S Leland, III
(74) *Attorney, Agent, or Firm* — NSIP Law

(57) ABSTRACT

A processor-implemented method includes: using an encoder, determining, for each of a plurality of tokens included in an input sequence, a self-attention weight based on a token and one or more tokens that precede the token in the input sequence; using the encoder, determining context information corresponding to the input sequence based on the determined self-attention weights; and using a decoder, determining an output sequence corresponding to the input sequence based on the determined context information.

22 Claims, 12 Drawing Sheets

(56) References Cited

U.S. PATENT DOCUMENTS

| | | | | |
|---|---|---|---|---|
| 2018/0129931 | A1* | 5/2018 | Bradbury | G06N 3/08 |
| 2018/0341860 | A1* | 11/2018 | Shazeer | G06N 3/0454 |
| 2018/0349359 | A1* | 12/2018 | McCann | G06F 40/30 |
| 2019/0075023 | A1* | 3/2019 | Sirotkin | H04L 41/082 |
| 2019/0130213 | A1* | 5/2019 | Shazeer | G06V 10/56 |
| 2019/0130913 | A1* | 5/2019 | Li | H04M 3/42221 |
| 2019/0149834 | A1* | 5/2019 | Zhou | H04N 21/8126 |
| | | | | 348/473 |
| 2019/0251431 | A1* | 8/2019 | Keskar | G06N 3/0454 |
| 2019/0355270 | A1* | 11/2019 | McCann | G06N 3/082 |
| 2020/0034436 | A1* | 1/2020 | Chen | G06N 3/0454 |
| 2020/0104371 | A1* | 4/2020 | Ma | G06F 40/58 |
| 2020/0342316 | A1* | 10/2020 | Shazeer | G06N 3/0445 |
| 2021/0110258 | A1* | 4/2021 | Lee | G06N 3/0454 |
| 2021/0342977 | A1* | 11/2021 | Xia | G06V 10/82 |
| 2022/0161423 | A1* | 5/2022 | Perez | G06N 20/00 |

OTHER PUBLICATIONS

Toda, T et al., "Implementation of Computationally Efficient Real-Time Voice Conversion", *INTERSPEECH2012 ISCA's 13th Annual Conference*, Sep. 2012, (pp. 94-97).

Vaswani A. et al., "Attention is All You Need", *31st Conference on Neural Information Processing Systems*, Dec. 6, 2017, (15 pages in English).

Jo, Yongrae, "Faster Models in Lstm", Jan. 25, 2018 (6 pages in English and 6 pages in Korean).

Im, Jinbae, "Distance-Based Directional Self-Attention Network", *Seoul National University*, 2018, (46 pages in English).

Cho, Wonho, "Transformer Network", Feb. 2019 (3 pages in English and 10 pages in Korean).

Ahn, Yongjoo, "Predicting Sequence Specificities of Transcription Factors with Self-Attention Sequence Modeling", *Seoul National University*, 2019, (45 pages in English).

* cited by examiner

FIG. 3

|   | A  | B  | C  | D  | E  |
|---|----|----|----|----|----|
| A | AA |    |    |    |    |
| B | BA | BB |    |    |    |
| C | CA | CB | CC |    |    |
| D | DA | DB | DC | DD |    |
| E | EA | EB | EC | ED | EE |

METHOD AND APPARATUS WITH MODEL TRAINING AND/OR SEQUENCE RECOGNITION

CROSS-REFERENCE TO RELATED APPLICATION

This application claims the benefit under 35 USC § 119(a) of Korean Patent Application No. 10-2019-0127019 filed on Oct. 14, 2019, in the Korean Intellectual Property Office, the entire disclosure of which are incorporated herein by reference for all purposes.

BACKGROUND

1. Field

The following description relates to a method and apparatus with model training and/or sequence recognition.

2. Description of Related Art

A typical sequence-to-sequence neural network may be modeled, trained, and/or configured to determine context information corresponding to an entire input sequence and output an output sequence based on the context information determined for the entire input sequence. Accordingly, the typical sequence-to-sequence neural network may require the entire input sequence to be input in order to determine any or all portions of the output sequence, and thus the typical sequence-to-sequence neural network may not be configured to generate a partial output of the output sequence based on a partial input of the input sequence. Accordingly, when implemented in a field of applications such as real-time machine interpretation/translation and/or real-time speech recognition that use gradual streaming, the typical sequence-to-sequence neural network may not be configured to generate a result for a partial input of the input sequence. In the field of applications such as real-time machine interpretation/translation and/or real-time speech recognition, entire information of the input sequence may not be used in generating portions of the output sequence, and thus a highly accurate and consistent result may not be output from the typical sequence-to-sequence neural network.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes: using an encoder, determining, for each of a plurality of tokens included in an input sequence, a self-attention weight based on a token and one or more tokens that precede the token in the input sequence; using the encoder, determining context information corresponding to the input sequence based on the determined self-attention weights; and using a decoder, determining an output sequence corresponding to the input sequence based on the determined context information.

The method may include training the encoder and the decoder based on the determined output sequence.

The determining of the self-attention weight may include: masking token relationships between the token and each of tokens that follow the token in the input sequence; and determining the self-attention weight based on a result of the masking.

The determining of the self-attention weight based on a result of the masking may include excluding a consideration of one or more of the tokens that follow the token.

The determining of the self-attention weight may include: determining the self-attention weight based on the token and each of a preset number of the tokens that precede the token in the input sequence.

The determining of the self-attention weight may include: determining the self-attention weight using two or more of the tokens included in the input sequence.

The determining of the self-attention weight may include: determining the self-attention weight based on the token and each of remaining tokens excluding a preset number of tokens among the tokens that precede the token in the input sequence.

The training of the encoder and the decoder may include: training the encoder and the decoder such that a loss between a true sequence corresponding to the input sequence and the output sequence is less than or equal to a threshold.

The encoder and the decoder may correspond to a transformer model.

Either one or both of the input sequence or the output sequence may be any one of speech data, sentence data, image data, biodata, and handwriting data.

A non-transitory computer-readable storage medium may store instructions that, when executed by one or more processors, configure the one or more processors to perform the method.

In another general aspect, a processor-implemented method includes: using an encoder, determining, each time a token included in an input sequence is input or obtained, a self-attention weight based on an input token and one or more tokens that precede the input token in the input sequence; determining context information corresponding to the currently input tokens based on the determined self-attention weight; and using a decoder, determining an output sequence corresponding to the currently input tokens based on the determined context information.

The determining of the self-attention weight may include: masking token relationships between the token and each of tokens that follow the token among the currently input tokens; and determining the self-attention weight based on a result of the masking.

The determining of the context information may include: updating the context information each time the token of the input sequence is input.

The determining of the self-attention weight may include: determining the self-attention weight based on the token and each of a preset number of the tokens that precede the token among the currently input tokens.

The determining of the self-attention weight may include: determining the self-attention weight using two or more tokens among the currently input tokens.

The determining of the self-attention weight may include: determining the self-attention weight based on the token and each of remaining tokens excluding a preset number of tokens among the tokens that precede the token among the currently input tokens.

The determining of the context information may include determining, for each of the tokens, context information corresponding to the token and the one or more of tokens that precede the token based on the determined self-attention weight of the token, and the determining of the output sequence on may include determining, for each of the tokens, a portion of the output sequence corresponding to the token based on the determined context corresponding to the token.

The method may include training the encoder and the decoder based on the determined output sequence.

In another general aspect, an apparatus includes: one or more processors configured to: determine, for each of a plurality of tokens included in an input sequence, a self-attention weight based on the token and one or more tokens that precede the token in the input sequence; determine, context information corresponding to the input sequence based on the determined self-attention weight; and determine, an output sequence corresponding to the input sequence based on the determined context information.

The one or more processors may be configured to train, based on the determined output sequence, an encoder for the determining of the self-attention weight and the determining of the context information and a decoder for the determining of the output sequence.

For the determining of the self-attention weight, the one or more processors may be configured to: mask token relationships between the token and each of tokens that follow the token in the input sequence; and determine the self-attention weight based on a result of the masking.

For the determining of the self-attention weight, the one or more processors may be configured to: determine the self-attention weight based on the token and each of a preset number of tokens that precede the token in the input sequence.

For the determining of the self-attention weight, the one or more processors may be configured to: determine the self-attention weight using two or more of the tokens included in the input sequence.

For the determining of the self-attention weight, the one or more processors may be configured to: determine the self-attention weight based on the token and each of remaining tokens excluding a preset number of tokens among the tokens that precede the token in the input sequence.

For the determining of the self-attention weight, the one or more processors may be configured to: mask token relationships between the token and each of tokens that follow the token in the input sequence; and determine the self-attention weight based on a result of the masking.

For the determining of the self-attention weight, the one or more processors may be configured to: determine the self-attention weight based on the token and each of a preset number of tokens that precede the token in the input sequence.

For the determining of the self-attention weight, the one or more processors may be configured to: determine the self-attention weight using two or more of the tokens included in the input sequence.

For the determining of the self-attention weight, the one or more processors may be configured to: determine the self-attention weight based on the token and each of remaining tokens excluding a preset number of tokens among the tokens that precede the token in the input sequence.

In another general aspect, a processor-implemented method includes: determining a self-attention weight of a token of an input sequence by considering a relation between the token and one or more tokens that precede the token in the input sequence and excluding a relation between the token and one or more tokens that follow the token in the input sequence; and determining a portion of an output sequence corresponding to the token based on the determined self-attention weight of the token.

Other features and aspects will be apparent from the following detailed description, the drawings, and the claims.

BRIEF DESCRIPTION OF THE DRAWINGS

FIG. 3 illustrates an attention rate matrix for encoder masking according to one or more embodiments.

Figure 1:
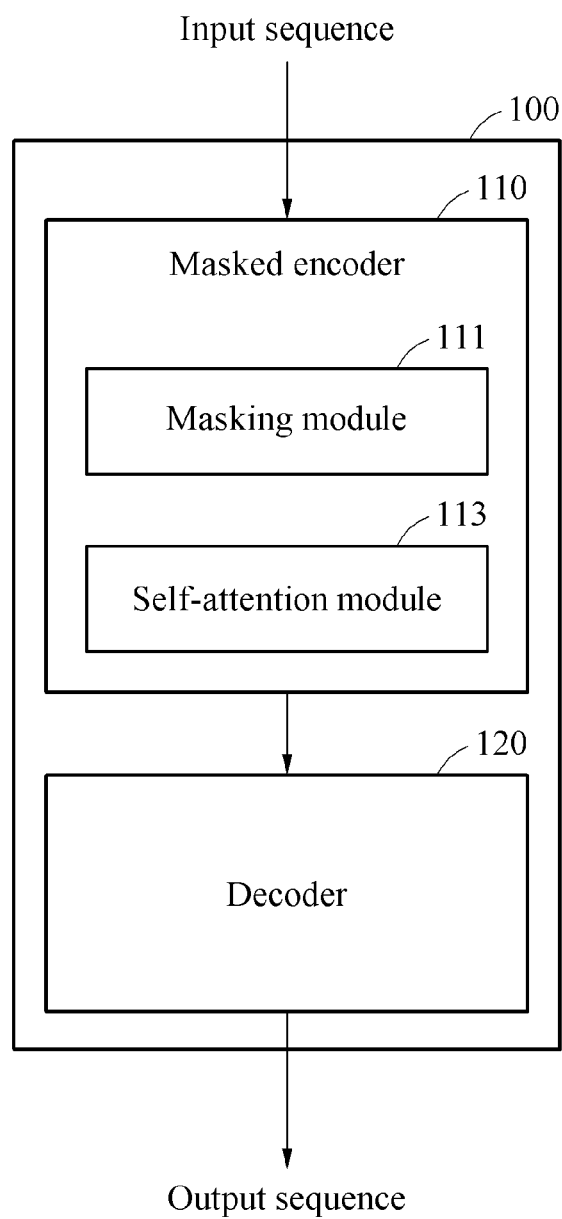
FIG. 1 illustrates a neural network-based data processing apparatus according to one or more embodiments.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein. The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will cause ambiguous interpretation of the example embodiments.

Hereinafter, examples will be described in detail with reference to the accompanying drawings, and like reference numerals in the drawings refer to like elements throughout.

FIG. 1 illustrates a neural network-based data processing apparatus according to one or more embodiments.

Referring to FIG. 1, a neural network-based data processing apparatus 100 may determine in real time an output sequence corresponding to an input sequence using a masked encoder 110 and a decoder 120. At least one of the input sequence or the output sequence may include a plurality of tokens in chronological or sequential order, such as, for example, speech data, sentence data, image data, biodata, handwriting data, and the like.

For example, when machine interpretation is performed in the data processing apparatus 100, the input sequence may be speech data expressed in a first language and the output sequence may be speech data expressed in a second language. For another example, when machine translation is performed in the data processing apparatus 100, the input sequence may be sentence data expressed in a first language and the output sequence may be sentence data expressed in a second language. For still another example, when speech recognition is performed in the data processing apparatus 100, the input sequence may be speech data including a speech uttered by a user and the output sequence may be sentence data including one or more words. For yet another example, when speech synthesis is performed in the data processing apparatus 100, the input sequence may be sentence data and the output sequence may be speech data. For further another example, when handwriting recognition is performed in the data processing apparatus 100, the input sequence may be handwriting (or penmanship) data of a user and the output sequence may be sentence data.

As described above, the data processing apparatus 100 may be used in, and examples include corresponding embodiments thereof, a wide range of application fields, such as, for example, machine interpretation, machine translation, speech recognition, speech synthesis, and handwriting recognition. Although operations of the data processing apparatus 100 will be described hereinafter mainly in relation to real-time machine interpretation for convenience of description, the following description may also be applicable to machine translation, speech recognition, speech synthesis, handwriting recognition, and other forms of interpretation, translation, recognition, and/or synthesis where the input sequence and/or the output sequence includes a plurality of tokens in chronological and/or sequential order, as non-limiting examples.

In an example of FIG. 1, when an input sequence is input to the masked encoder 110, the data processing apparatus 100 may determine a self-attention weight among a plurality tokens included in the input sequence. In an example, for each of the tokens in the input sequence, a self-attention weight of the token may be determined with respect to a token that precedes the token in the input sequence. For example, the data processing apparatus 100 may perform a masking operation to remove (or mask) a self-attention weight of each of tokens that follow the token in the input sequence. In addition, the data processing apparatus 100 may determine, using the masked encoder 110, context information corresponding to the input sequence based on the self-attention weight. When the context information is transferred from the masked encoder 110 to the decoder 120, the data processing apparatus 100 may determine an output sequence corresponding to the input sequence based on the context information.

In an example, the masked encoder 110 and the decoder 120 may correspond to a transformer model. The transformer model may be a neural network that is different from a recurrent neural network (RNN) and configured to implement an attention-based encoder-decoder structure and process sequence data. Self-attention, based on a correlation among the tokens in the input sequence, may be input to the transformer model, and the transformer model may calculate the self-attention weight and apply the self-attention weight to the context information to be transferred from the masked encoder 110 to the decoder 120. A description of an example transformer model may be found in a research paper by Vaswani et al., "Attention Is All You Need" (2017), the disclosure of which is incorporated herein.

The masked encoder 110 may include a masking module 111 and a self-attention module 113. The masking module 111 may determine a mask to be applied to the masked encoder 110. The self-attention module 113 may apply the mask determined in the masking module 111 to the self-attention weight. The decoder 120 may determine the output sequence based on the context information transferred from the masked encoder 110.

In an inference phase, the data processing apparatus 100 may update the context information each time a portion of the tokens of the input sequence is input to the masked encoder 110, and output by the decoder 120 in real time a portion of tokens of the output sequence. For example, even when only a portion of the tokens (e.g., less than all of the tokens) of the input sequence is input to the masked encoder 110, the data process apparatus 100 may perform an inference operation such that a portion of tokens of the output sequence corresponding to the input portion of the tokens of the input sequence is output from the decoder 120, and thus may output portions of the output sequence sequentially in real time. In contrast, a typical data process apparatus may determine any or all portions of the output sequence only when all tokens of the input sequence are all input to typical data process apparatus, and thus may not output portions of the output sequence sequentially in real time.

The transformer model corresponding to the masked encoder 110 and the decoder 120 may be trained to minimize a loss between the output sequence and a predetermined true sequence of training data. In the training phase, the data processing apparatus 100 may train the masked encoder 110 and the decoder 120 through supervised learning. The supervised learning may be performed to update parameters in the masked encoder 110 and the decoder 120 such that, when a training input of training data is input to the masked encoder 110, output data corresponding to a training output of the training data is output from the decoder 120. The training data may include a pair of the training input and the training output. Non-limiting examples of the training will be described in greater detail hereinafter with reference to FIGS. 2 through 7. The masked encoder 110 may be simply referred to herein as an encoder for convenience of description. The data processing apparatus 100 may be configured to process input sequence data and output processed sequence data, and be one of a model training apparatus and a sequence recognition apparatus which will be described hereinafter.

Figure 2:
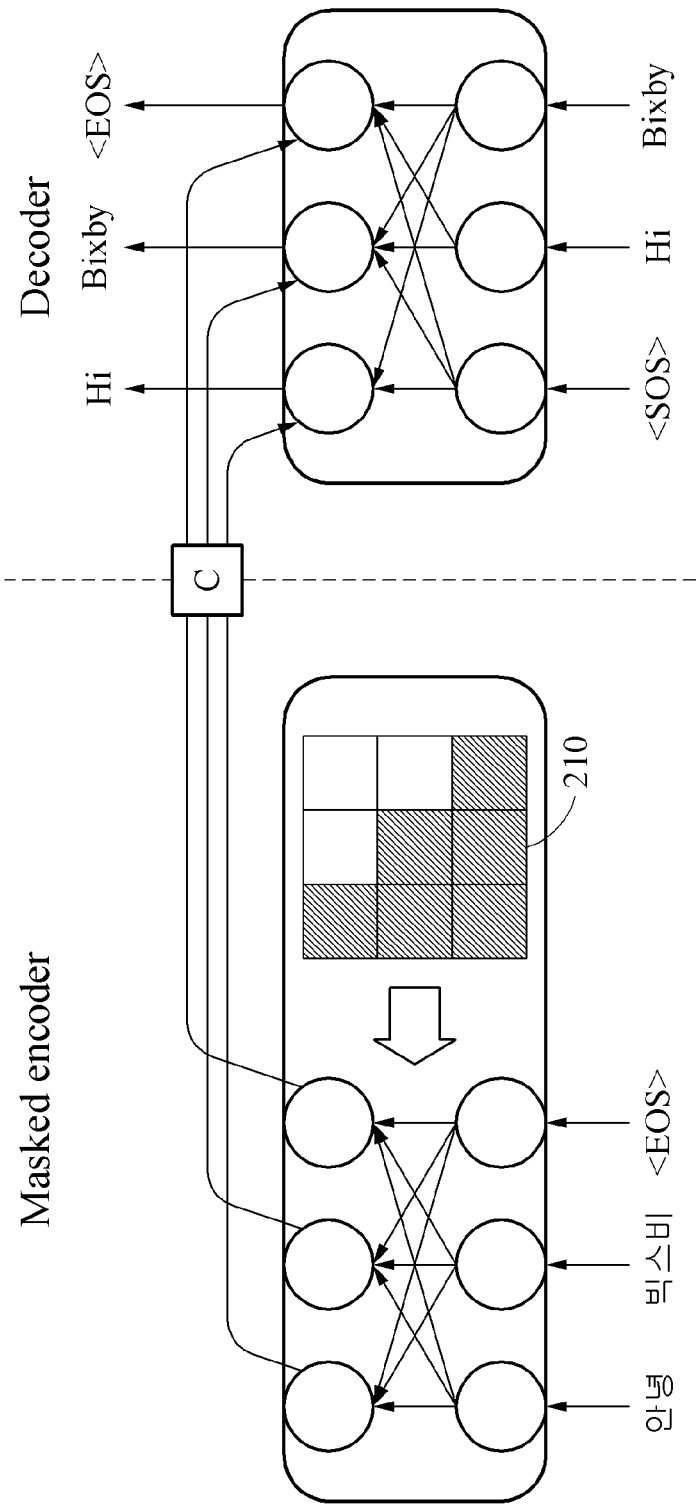
FIG. 2 illustrates model training according to one or more embodiments.

FIG. 2 illustrates model training according to one or more embodiments.

Referring to FIG. 2, a model training apparatus trains an encoder and a decoder. In an example of FIG. 2, an input sequence "안녕 빅스비" in the Korean language is input to the encoder and an output sequence "Hi Bixby" (where "hi" is determined to correspond to "안녕" and "Bixby" is determined to correspond to "빅스비") is output from the decoder in response to the input sequence being input to the encoder. The encoder may include one or more self-attention layers and feed-forward layers.

For example, when the input sequence "안녕 빅스비" is input to the encoder, a self-attention weight between tokens "안녕" and "빅스비" included in the input sequence may be determined. In an example, for each of the tokens in the input sequence, a self-attention weight of the token may be determined with respect to a token that precedes the token in the input sequence. For example, a self-attention weight of the token "빅스비" may be determined with respect to the tokens "안녕" and "빅스비." However, a self-attention weight of the token "안녕" may be determined only with respect to the token "안녕." Such a method of determining a self-attention weight may be implemented by an attention rate matrix 210, a non-limiting example of which will be described hereinafter in greater detail with reference to FIG. 3.

The self-attention weight determined using the encoder may be applied to context information that is to be transferred to the decoder. The decoder may then determine the output sequence "Hi Bixby" corresponding to the input sequence "안녕 빅스비" based on the context information. The model training apparatus may calculate a loss between the output sequence "Hi Bixby" which is output in response to the input sequence "안녕 빅스비" and a true sequence, for example, a training output. The model training apparatus may train the encoder and the decoder such that the loss is reduced (e.g., such that the loss is less than or equal to a predetermined threshold).

FIG. 3 illustrates an attention rate matrix for encoder masking according to one or more embodiments.

FIG. 3 illustrates an example of an attention rate matrix used to determine a self-attention weight of an input sequence "A B C D E." In an example of FIG. 3, the input sequence "A B C D E" may be input to an encoder, and each of A, B, C, D, and E may be, or correspond to/denote, a word included in the input sequence and indicate a token.

As described above, for each token in the input sequence, a self-attention weight of the token may be determined with respect to the token and one or more of tokens that precede the token in the input sequence. For example, a self-attention weight of the token A that is positioned first in the input sequence and has thus no preceding tokens in the input sequence may be determined only with respect to the token A and not with respect to the tokens B, C, D, and E; a self-attention weight of the token B may be determined with respect to the tokens A and B, not with respect to the tokens C, D, and E; a self-attention weight of the token C may be determined with respect to the tokens A, B, and C; a self-attention weight of the token D may be determined with respect to the tokens A, B, C, and D; and a self-attention weight of the token E may be determined with respect to the tokens A, B, C, D, and E.

A relationship among the tokens that determines such self-attention weights may be represented by an attention rate matrix illustrated in FIG. 3, for example. The shaded portion of the illustrated attention rate matrix, e.g., similar to the attention rate matrix 210 of FIG. 2, indicates a token relationship from which a self-attention weight may be determined, and an un-shaded portion of the attention rate matrix indicates a token relationship from which a self-attention weight may not be determined. In an example, each shaded potion of the attention rate matrix indicates a token relationship from which a respective self-attention weight may be determined.

As illustrated, a relationship between a portion of tokens may be excluded from when determining a self-attention weight, and thus the attention rate matrix may also be referred to as a mask to be applied in the determining of the self-attention weight. The mask illustrated in FIG. 3 may be a monotonic increment mask, and used for a model configured to determine a self-attention weight among currently input tokens based on each input token and gradually output an output sequence. For example, the mask may be used to determine the self-attention weight for use in, for example, real-time machine interpretation and real-time speech recognition where current and previous input information is gradually used or obtained/provided, as non-limiting examples.

Figure 4:
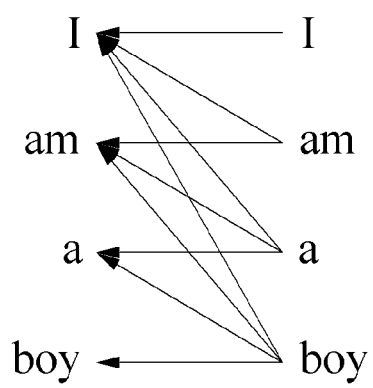
FIG. 4 illustrates self-attention based on encoder masking according to one or more embodiments.

FIG. 4 illustrates self-attention based on encoder masking according to one or more embodiments.

FIG. 4 illustrates an example of a self-attention relationship between tokens in an input sequence "I am a boy," which is provided to help a more intuitive understanding of a relationship between tokens represented by a matrix form in FIG. 3, for example. In an example of FIG. 4, a self-attention weight of a token "I" positioned first in the input sequence may be determined based on a relationship of the token "I" itself; a self-attention weight of a token "am" is determined based on a relationship between the tokens "I" and "am"; a self-attention weight of a token "a" is determined based on a relationship among the tokens "I," "am," and "a"; and a self-attention weight of a token "boy" is determined based on a relationship among the tokens "I," "am," "a," and "boy."

Figure 5:
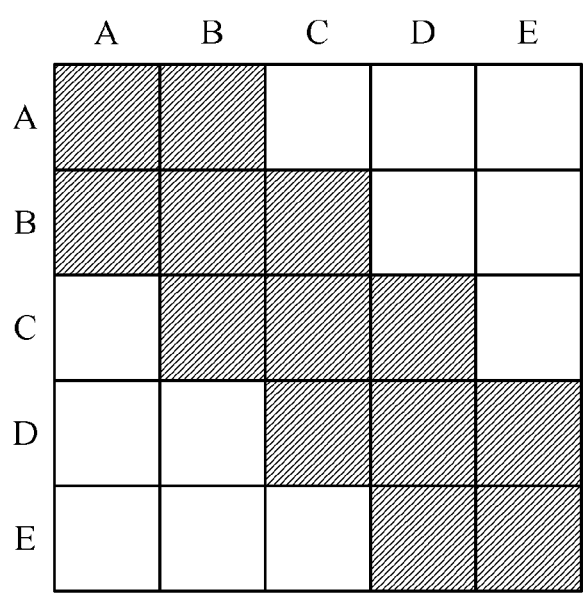
FIGS. 5 through 7 illustrate attention rate matrices according to one or more embodiments.
Figure 6:
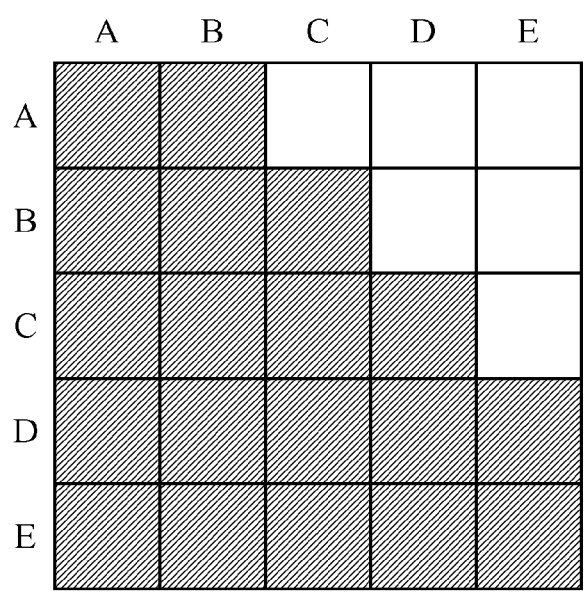
Figure 7:
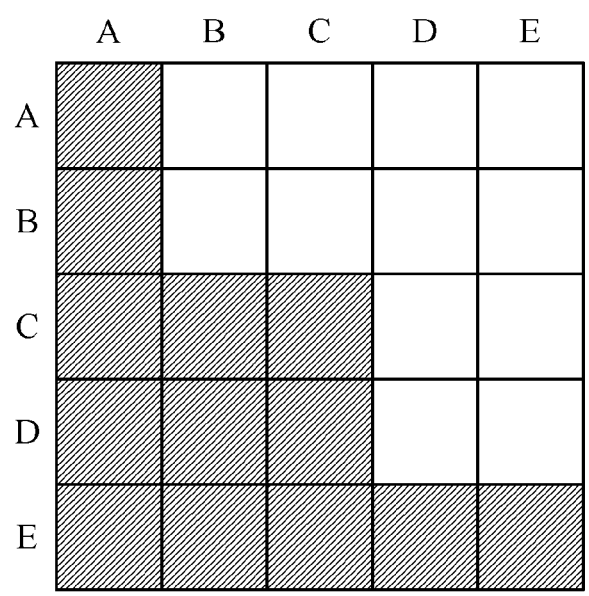

FIGS. 5 through 7 illustrate examples of attention rate matrices according to one or more embodiments.

FIG. 5 illustrates a sliding window mask according to one or more embodiments. Through the sliding window mask, for each token in an input sequence, a self-attention weight with respect to the token and each of a preset number of tokens that precede the token in an input sequence may be determined. For example, only tokens with a preset length in the input sequence may be applied at each point in time to a model configured to output a result. Compared to the monotonic increment mask illustrated in FIG. 3, while the monotonic increment mask may apply all previously input tokens, the sliding window mask may apply only a preset number of tokens among the previously input tokens in determining the self-attention weight of the token. For example, the sliding window mask may be applied to, for example, real-time machine interpretation and real-time speech recognition where current and previous input information is gradually used or obtained/provided, as non-limiting examples. For example, in a case in which a long-distance dependency is not significant for a language pair in machine translation, or forgetting is desirable, the sliding window mask may improve performance by preventing dispersion of an attention weight between an input sequence and an output sequence.

FIG. 6 illustrates a delayed increment mask according to one or more embodiments. Through the delayed increment mask, a self-attention weigh may be determined using two or more tokens included in an input sequence. For example, a self-attention weight may not be determined for a first token included in the input sequence, and a self-attention weight may be determined first from a preset nth token. Compared to the monotonic increment mask illustrated in FIG. 3, while a self-attention weight may be determined first for a first token included in an input sequence through the monotonic increment mask, a self-attention weight may be determined first from a preset nth token in the input sequence through the delayed increment mask. For example, the delayed increment mask may be applied to a model in which a plurality of initially input tokens is applied and an initial result token is output and gradually processed. For example, in a case in which a long-distance dependency is not significant for a language pair in machine translation, the delayed increment mask may improve performance by preventing dispersion of an attention weight between an input sequence and an output sequence. In addition, the delayed increment mask may be applied to, for example, machine interpretation and machine translation where a plurality of initial inputs is applied and an output is gradually generated, and thus contribute to improving accuracy of the output.

FIG. 7 illustrates a skipped increment mask according to one or more embodiments. Through the skipped increment mask, a self-attention weight of each of remaining tokens excluding a preset number of tokens among tokens that precede a corresponding token in an input sequence may be determined. For example, a self-attention weight may be determined for a preset number (a) of tokens up to a preset nth token in an input sequence, and a self-attention weight may be determined for a preset number (b) of tokens from an n+1th token up to an mth token, in which a is less than b (a<b). Compared to the monotonic increment mask illustrated in FIG. 3, through the monotonic increment mask, the number of tokens to be considered or applied when determining a self-attention weight of a corresponding token may also increase as the number of input tokens increases. In contrast, through an example of the skipped increment mask of FIG. 7, the number of tokens to be considered or applied when determining a self-attention weight of a corresponding token may not increase immediately, but increase discretely, even though the number of input tokens increases. The skipped increment mask may be applied to a model that skips a portion of intermediate input tokens when calculating a self-attention weight and gradually generates a result, thereby reducing a calculation or computational amount. For example, when an input token is determined in a unit of morpheme, but a model performs processing in a unit of word, the skipped increment mask may be used to maintain the number of tokens considered or applied when determining a self-attention weight until a single word is completed, and then to increase the number afterward.

Figure 8:
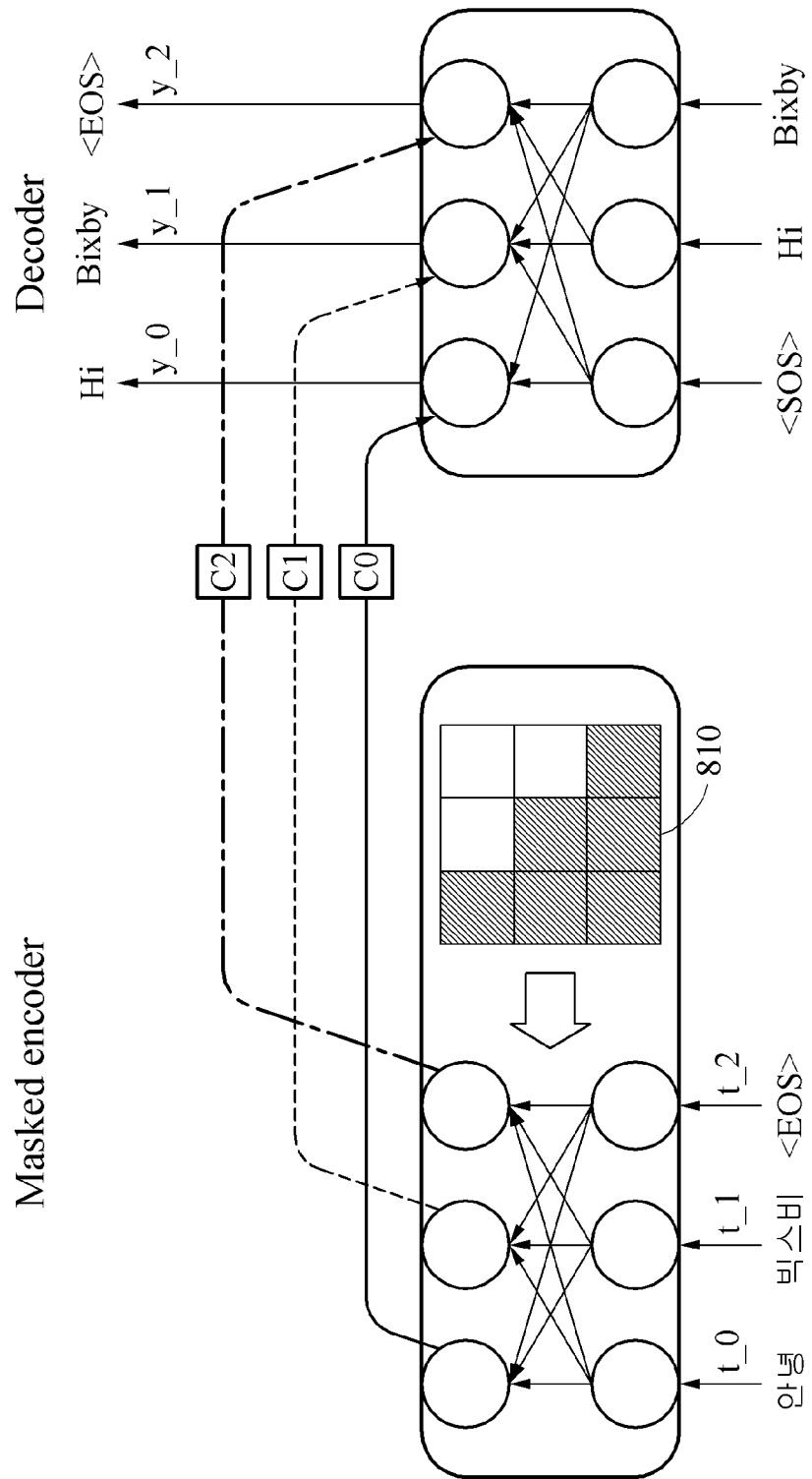
FIGS. 8 and 9 illustrate sequence recognition according to one or more embodiments.
Figure 9:
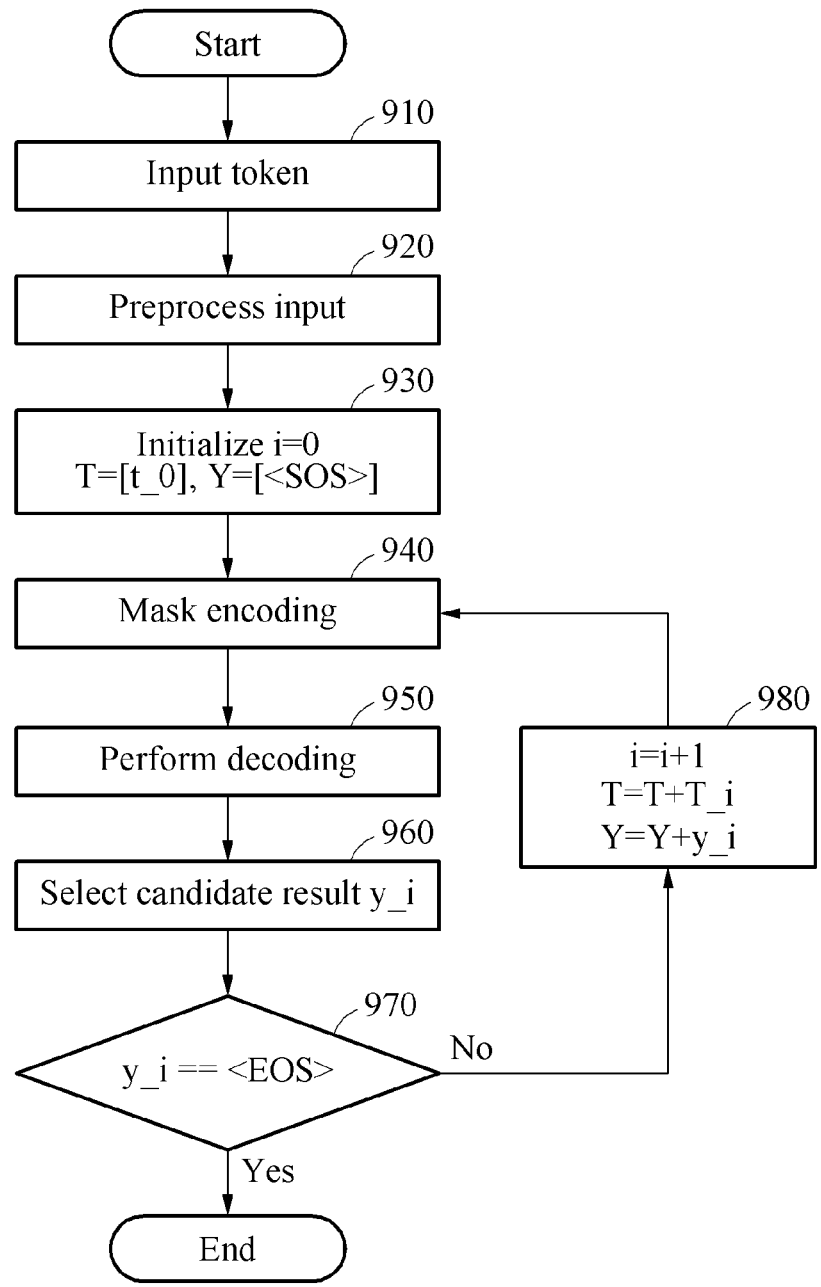

FIGS. 8 and 9 illustrate sequence recognition according to one or more embodiments.

FIG. 8 illustrates an example of how a sequence recognition apparatus may recognize an input sequence using an encoder and a decoder. In an example of FIG. 8, a speech input sequence "안녕 빅스비" may be input through real-time machine interpretation, and a speech output sequence "Hi Bixby" may be output.

In an example, when a user utters the input sequence "안녕 빅스비," tokens "안녕" and "빅스비" included in the input sequence may be input in sequential order to the encoder. For example, when the token "안녕" is input to the encoder at a point in time t_0, the encoder may determine context information C0 based on the currently input token "안녕", and the decoder may output a portion "Hi" of tokens of the output sequence based on the context information C0. Subsequently, when the token "빅스비" is input to the encoder at a point in time t_1, the encoder may determine context information C1 based on the currently input tokens "안녕" and "빅스비", and the decoder may output a portion "Bixby" of the tokens of the output sequence based on the context information C1. Subsequently, when a token <EOS> indicating that the utterance by the user ends is input to the encoder at a point in time t_2, the encoder may determine context information C2 based on the currently input tokens "안녕," "빅스비," and <EOS>, and the decoder may output a portion <EOS> of the tokens of the output sequence based on the context information C2. To determine context information based on currently input tokens, a self-attention weight may be used. Here, a method of determining a self-attention weight may be implemented by an attention rate matrix 810. For example, the encoder masking described above may also be applied to sequence recognition, using the attention rate matrix 810, and thus a more detailed description will be omitted here for brevity. For example, the attention rate matrix 810 may correspond to any one of the attention rate matrices of FIGS. 3 and 5-7.

Hereinafter, non-limiting example operations of the sequence recognition apparatus will be described with reference to FIG. 9. In operation 910, a token of an input sequence may be input. In operation 920, preprocessing (e.g., embedding and positional encoding) is performed on the input token. In operation 930, initialization may be performed to set i indicated by an index of a time step to be 0. In operation 940, mask encoding may be performed on currently input tokens, and context information may be determined. In operation 950, decoding may be performed on the context information. In operation 960, a result candidate y_i may be selected as a result of the decoding, and the selected candidate may be output as a result token. In operation 970, whether an end condition is satisfied or not may be verified. In operation 980, when the end condition is not satisfied, then the index i may be increased by 1.

As described above, whereas a typical sequence recognition apparatus may require all tokens of an input sequence to be input to the encoder in order to determine a self-attention weight for the tokens of input sequence, the sequence recognition apparatus of one or more embodiments may determine a self-attention weight among currently input tokens each time a portion of tokens of the input sequence is input and may update context information corresponding to the currently input tokens based on the determined self-attention weight. Thus, the sequence recognition apparatus of one or more embodiments may enable gradual output generation.

Figure 10:
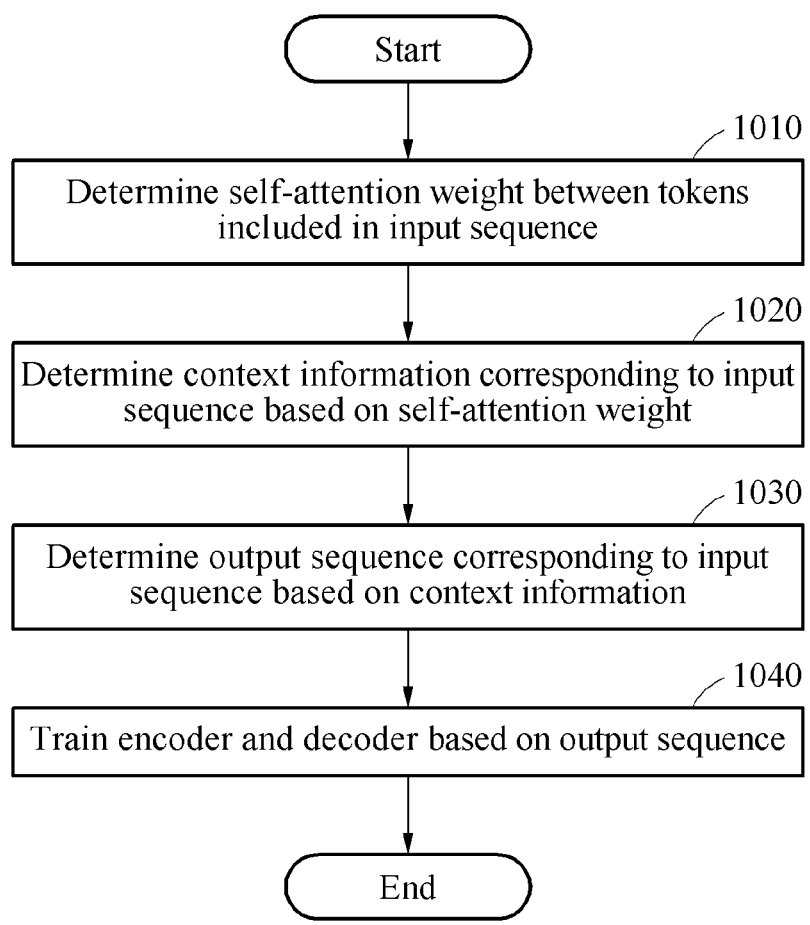
FIG. 10 illustrates a model training method according to one or more embodiments.

FIG. 10 is illustrates a model training method according to one or more embodiments.

A model training method to be described hereinafter with reference to FIG. 10 may be performed by a processor (e.g., one or more processors) of a model training apparatus (e.g, any of the model training apparatuses described above).

Referring to FIG. 10, in operation 1010, the model training apparatus may determine, using an encoder, a self-attention weight among a plurality of tokens included in an input sequence. For each of the tokens in the input sequence, a self-attention weight of the token may be determined based on the token and one or more of tokens that precede the token in the input sequence. In addition, for each of the tokens in the input sequence, the model training apparatus may mask a self-attention weight of each of tokens that follow the token in the input sequence.

For example, the model training apparatus may determine a self-attention weight of each of a preset number of tokens that precede the token in the input sequence. Further, the model training apparatus may determine the self-attention weight using two or more tokens included in the input sequence. Further still, the model training apparatus may determine a self-attention weight of each of remaining tokens excluding a preset number of tokens among the tokens that precede the token in the input sequence.

In operation 1020, the model training apparatus may determine, using the encoder, context information corresponding to the input sequence based on the self-attention weight.

In operation 1030, the model training apparatus determines, using a decoder, an output sequence corresponding to the input sequence based on the context information.

In operation 1040, the model training apparatus trains the encoder and the decoder based on the output sequence. The model training apparatus trains the encoder and the decoder such that a loss between the output sequence and a true sequence corresponding to the input sequence is reduced.

The encoder and the decoder may correspond to a transformer model. At least one of the input sequence or the output sequence may be one of speech data, sentence data, image data, biodata, or handwriting data.

For a more detailed description of non-limiting examples of the operations described with reference to FIG. 10, reference may be made to what has been described above with reference to the non-limiting examples of FIGS. 1 through 9, any one, or more, or all combinations of which may be included in the operations of FIG. 10.

Figure 11:
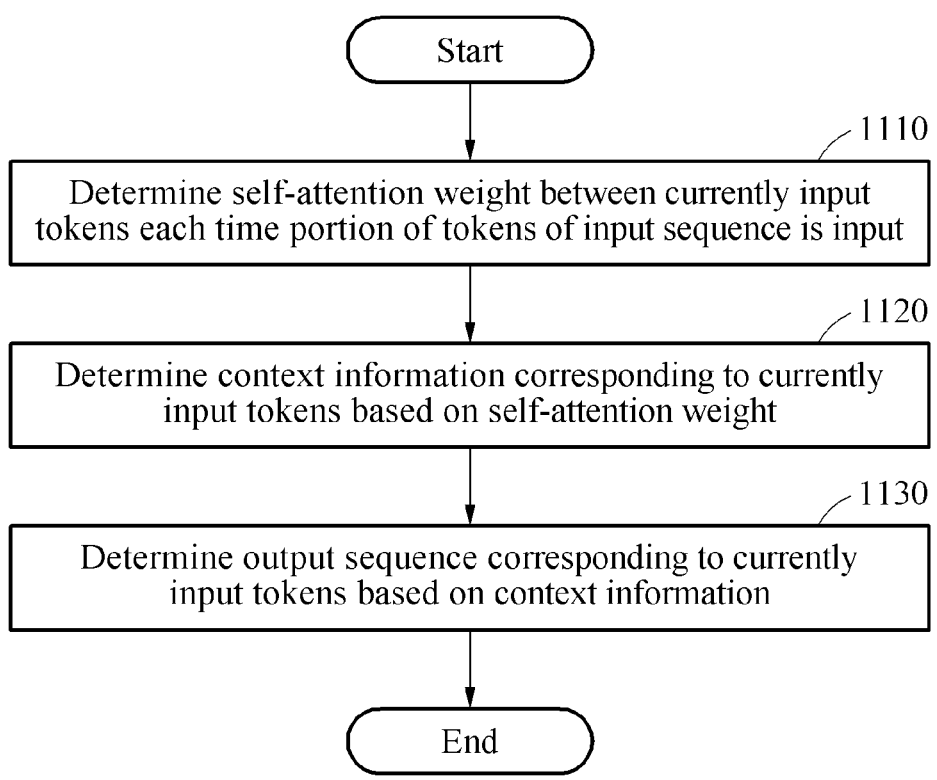
FIG. 11 illustrates a sequence recognition method according to one or more embodiments.

FIG. 11 illustrates a sequence recognition method according to one or more embodiments.

A sequence recognition method to be described hereinafter with reference to FIG. 11 may be performed by a processor of a sequence recognition apparatus (e.g, any of the sequence recognition apparatuses described above).

Referring to FIG. 11, in operation 1110, the sequence recognition apparatus may determine, using an encoder, a self-attention weight among currently input tokens each time a portion of tokens of an input sequence is input. The sequence recognition apparatus may determine a self-attention weight of each of the currently input tokens based on a corresponding token among the currently input tokens and one or more of tokens that precede the token.

In operation 1120, the sequence recognition apparatus may determine context information corresponding to the currently input tokens based on the self-attention weight. The sequence recognition apparatus may update the context information each time a portion of the tokens of the input sequence is input.

In operation 1130, the sequence recognition apparatus may determine, using a decoder, an output sequence corresponding to the currently input tokens based on the context information. When the context information is input to the decoder, probability values of candidate result tokens may be calculated, and a candidate result token having a greatest probability value among the candidate result tokens may be output through beam search or greedy search, for example.

For a more detailed description of non-limiting examples of the operations described with reference to FIG. 11, reference may be made to what has been described above with reference to the non-limiting examples of FIGS. 1 through 10, any one, or more, or all combinations of which may be included in the operations of FIG. 11.

Figure 12:
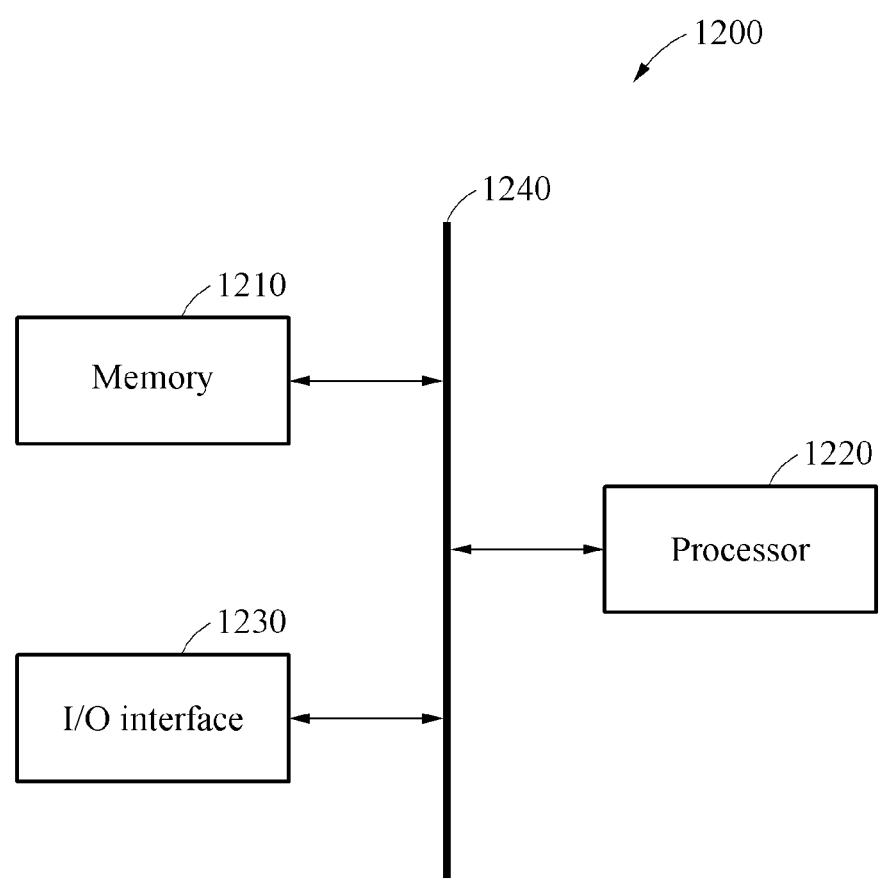
FIG. 12 illustrates a neural network-based data processing apparatus according to one or more embodiments.

FIG. 12 illustrates a neural network-based data processing apparatus according to one or more embodiments.

Referring to FIG. 12, a data processing apparatus 1200 may include a memory 1210, a processor 1220 (e.g., one or more processors), and an input and output (I/O) interface 1230. The memory 1210, the processor 1220, and the I/O interface 1230 may communicate with one another through a bus 1240.

The data processing apparatus 1200 may be configured to process an input sequence and output the processed sequence, and be one of the model training apparatus and the sequence recognition apparatus which are described herein.

The memory 1210 may include a computer-readable instruction. When the instruction stored in the memory 1210 is implemented by the processor 1220, any one, or more, or all combinations of operations described above with respect to FIGS. 1-11 may be performed. The memory 1210 may be a volatile or nonvolatile memory.

As described above, to calculate a self-attention weight of each token in an input sequence, a mask matrix may be used to perform a calculation only with currently input tokens.

Thus, in an example, the data processing apparatus 1200 may be configured to prevent dispersion of self-attention, improve accuracy of an output, and reduce a calculation or computational amount and a bandwidth of the data processing apparatus 1200. In addition, in an example, the data processing apparatus 1200 may be configured to output in real time a portion of tokens of an output sequence.

The data processing apparatus 1200 may thus be configured to perform any or all of the operations described above with respect to FIGS. 1-11.

The data processing apparatuses, the model training apparatuses, the sequence recognition apparatuses, encoders, decoders, masking modules, self-attention modules, memories, processors, input and output (I/O) interfaces, data processing apparatus 100, encoder 110, decoder 120, masking module 111, self-attention module 113, data processing apparatus 1200, memory 1210, processor 1220, input and output (I/O) interface 1230, and other apparatuses, units, modules, devices, and other components described herein with respect to FIGS. 1-12 are implemented by or representative of hardware components. Examples of hardware components that may be used to perform the operations described in this application where appropriate include controllers, sensors, generators, drivers, memories, comparators, arithmetic logic modules, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic module, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-12 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions used herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method comprising:
using an encoder, determining, for each of a plurality of tokens included in an input sequence, a self-attention weight based on a token and one or more tokens that precede the token in the input sequence;
using the encoder, determining context information corresponding to the input sequence based on the determined self-attention weights; and
using a decoder, determining an output sequence corresponding to the input sequence based on the determined context information.

2. The method of claim 1, further comprising training the encoder and the decoder based on the determined output sequence.

3. The method of claim 2, wherein the determining of the self-attention weight comprises:
masking token relationships between the token and each of tokens that follow the token in the input sequence; and
determining the self-attention weight based on a result of the masking.

4. The method of claim 2, wherein the determining of the self-attention weight comprises:
determining the self-attention weight based on the token and each of a preset number of the tokens that precede the token in the input sequence.

5. The method of claim 2, wherein the determining of the self-attention weight comprises:
determining the self-attention weight using two or more of the tokens included in the input sequence.

6. The method of claim 2, wherein the determining of the self-attention weight comprises:
determining the self-attention weight based on the token and each of remaining tokens excluding a preset number of tokens among the tokens that precede the token in the input sequence.

7. The method of claim 2, wherein the training of the encoder and the decoder comprises:
training the encoder and the decoder such that a loss between a true sequence corresponding to the input sequence and the output sequence is less than or equal to a threshold.

8. The method of claim 2, wherein the encoder and the decoder correspond to a transformer model.

9. The method of claim 2, wherein either one or both of the input sequence or the output sequence is any one of speech data, sentence data, image data, biodata, and handwriting data.

10. A non-transitory computer-readable storage medium storing instructions that, when executed by one or more processors, configure the one or more processors to perform the method of claim 2.

11. A processor-implemented method comprising:
using an encoder, determining, each time a token included in an input sequence is input or obtained, a self-attention weight based on an input token and one or more tokens that precede the input token in the input sequence;
determining context information corresponding to the currently input tokens based on the determined self-attention weight; and
using a decoder, determining an output sequence corresponding to the currently input tokens based on the determined context information.

12. The method of claim 11, wherein the determining of the self-attention weight comprises:
masking token relationships between the token and each of tokens that follow the token among the currently input tokens; and
determining the self-attention weight based on a result of the masking.

13. The method of claim 11, wherein the determining of the context information comprises:
updating the context information each time the token of the input sequence is input.

14. The method of claim 11, wherein the determining of the self-attention weight comprises:
determining the self-attention weight based on the token and each of a preset number of the tokens that precede the token among the currently input tokens.

15. The method of claim 11, wherein the determining of the self-attention weight comprises:
determining the self-attention weight using two or more tokens among the currently input tokens.

16. The method of claim 11, wherein the determining of the self-attention weight comprises:
determining the self-attention weight based on the token and each of remaining tokens excluding a preset number of tokens among the tokens that precede the token among the currently input tokens.

17. An apparatus comprising:
one or more processors configured to:
determine, for each of a plurality of tokens included in an input sequence, a self-attention weight based on a token and one or more tokens that precede the token in the input sequence;
determine, context information corresponding to the input sequence based on the determined self-attention weight; and
determine, an output sequence corresponding to the input sequence based on the determined context information.

18. The apparatus of claim 17, wherein the one or more processors is configured to train, based on the determined output sequence, an encoder for the determining of the self-attention weight and the determining of the context information and a decoder for the determining of the output sequence.

19. The apparatus of claim 18, wherein, for the determining of the self-attention weight, the one or more processors is configured to:
   mask token relationships between the token and each of tokens that follow the token in the input sequence; and
   determine the self-attention weight based on a result of the masking.

20. The apparatus of claim 18, wherein, for the determining of the self-attention weight, the one or more processors is configured to:
   determine the self-attention weight based on the token and each of a preset number of tokens that precede the token in the input sequence.

21. The apparatus of claim 18, wherein, for the determining of the self-attention weight, the one or more processors is configured to:
   determine the self-attention weight using two or more of the tokens included in the input sequence.

22. The apparatus of claim 18, wherein, for the determining of the self-attention weight, the one or more processors is configured to:
   determine the self-attention weight based on the token and each of remaining tokens excluding a preset number of tokens among the tokens that precede the token in the input sequence.

* * * * *